United States Patent
Koshel et al.

(10) Patent No.: US 9,160,963 B2
(45) Date of Patent: Oct. 13, 2015

(54) TERMINAL AND METHOD FOR GENERATING LIVE IMAGE

(71) Applicant: Samsung Electronics Co., Ltd., Gyeonggi-do (KR)

(72) Inventors: Maksym Koshel, Kiev (UA); Sergey Pometun, Kiev (UA); Dmytro Dorogovtsev, Kiev (UA); Mykola Raievskyi, Chercasy (UA)

(73) Assignee: Samsung Electronics Co., Ltd (KR)

( * ) Notice: Subject to any disclaimer, the term of this patent is extended or adjusted under 35 U.S.C. 154(b) by 47 days.

(21) Appl. No.: 13/962,404

(22) Filed: Aug. 8, 2013

(65) Prior Publication Data

US 2014/0044412 A1 Feb. 13, 2014

(30) Foreign Application Priority Data

Aug. 8, 2012 (KR) .................. 10-2012-0086599

(51) Int. Cl.
- *H04N 5/93* (2006.01)
- *H04N 5/92* (2006.01)
- *H04N 9/88* (2006.01)
- *G11B 27/00* (2006.01)
- *H04N 5/91* (2006.01)
- *G09G 5/00* (2006.01)
- *G06T 13/80* (2011.01)

(52) U.S. Cl.
CPC ........ *H04N 5/91* (2013.01); *G06T 13/80* (2013.01); *G09G 5/00* (2013.01); *G09G 2320/046* (2013.01)

(58) Field of Classification Search
USPC .................. 386/263, 271, 278, 280, 326, 353
See application file for complete search history.

(56) References Cited

U.S. PATENT DOCUMENTS

| 6,285,804 | B1 * | 9/2001 | Crinon et al. ................. 382/299 |
| 6,636,220 | B1 | 10/2003 | Szeliski et al. |
| 7,307,654 | B2 * | 12/2007 | Chang ........................ 348/218.1 |
| 2011/0038612 | A1 | 2/2011 | Joffe et al. |
| 2011/0157315 | A1 * | 6/2011 | Bennett et al. .................. 348/46 |

FOREIGN PATENT DOCUMENTS

GB 2466033 * 6/2010

* cited by examiner

*Primary Examiner* — Daquan Zhao
(74) *Attorney, Agent, or Firm* — The Farrell Law Firm, P.C.

(57) ABSTRACT

A terminal for generating a live image includes a memory for storing video content, and a live image generator for selecting a number of original frames from original frames constituting the video content in a standby mode, generating a new live image by interpolating the number of selected original frames, and outputting the generated live image as live wallpaper for the standby mode.

19 Claims, 6 Drawing Sheets

TERMINAL AND METHOD FOR GENERATING LIVE IMAGE

PRIORITY

This application claims priority under 35 U.S.C. §119(a) to an application filed in the Korean Industrial Property Office on Aug. 8, 2012 and assigned Serial No. 10-2012-0086599, the contents of which are incorporated herein by reference.

BACKGROUND OF THE INVENTION

1. Field of the Invention

The present invention relates generally to a terminal and method for generating live images, and more particularly, to a live image generation terminal and method capable of generating and outputting a new live image in each of a plurality of standby modes using single video content.

2. Description of the Related Art

A variety of wallpapers set by a user may be displayed in a standby mode of a terminal. Still or live images for live wallpapers, which are stored in the terminal, may be set by the user and displayed.

The live images tend to generate a more dynamic live wallpaper display than the still images.

The live wallpapers generally include objects with small movements such as waves and waterfalls, rather than objects with large movements such as cars and people.

Therefore, when one live image is set as live wallpaper for the standby mode, a dynamic live image may be displayed, but the same movement may be undesirably repeated in every standby mode.

SUMMARY OF THE INVENTION

An aspect of embodiments of the present invention is to provide a live image generation terminal and method capable of generating and outputting a new live image in every standby mode using single video content.

In accordance with an aspect of the present invention, there is provided a terminal for generating a live image, the terminal including a memory for storing video content, and a live image generator for selecting a number of original frames from original frames constituting the video content in a standby mode, generating a new live image by interpolating the number of selected original frames, and outputting the generated live image as live wallpaper for the standby mode.

In accordance with another aspect of the present invention, there is provided a method for generating a live image, including selecting a number of original frames from original frames constituting video content, generating a new live image by interpolating the number of selected original frames, and outputting the generated live image as live wallpaper for a standby mode.

BRIEF DESCRIPTION OF THE DRAWINGS

The above and other aspects, features and advantages of embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Embodiments of the present invention will now be described in detail with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for the sake of clarity and conciseness.

Terminals, to which embodiments of the present invention are applicable, may include both mobile terminals and fixed terminals. The mobile terminals, which are portable mobile electronic devices, may include video phones, mobile phones, smart phones, International Mobile Telecommunication-2000 (IMT-2000) terminals, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, e-Book readers, portable computers, such as laptops and tablets, and digital computers. The fixed terminals may include desktop Personal Computers (PCs).

In embodiments of the present invention, video content provided to generate live images used as live wallpapers may include a plurality of frames for dynamically displaying objects having small or internal movements, such as waterfalls, flames, and seas.

Figure 1:
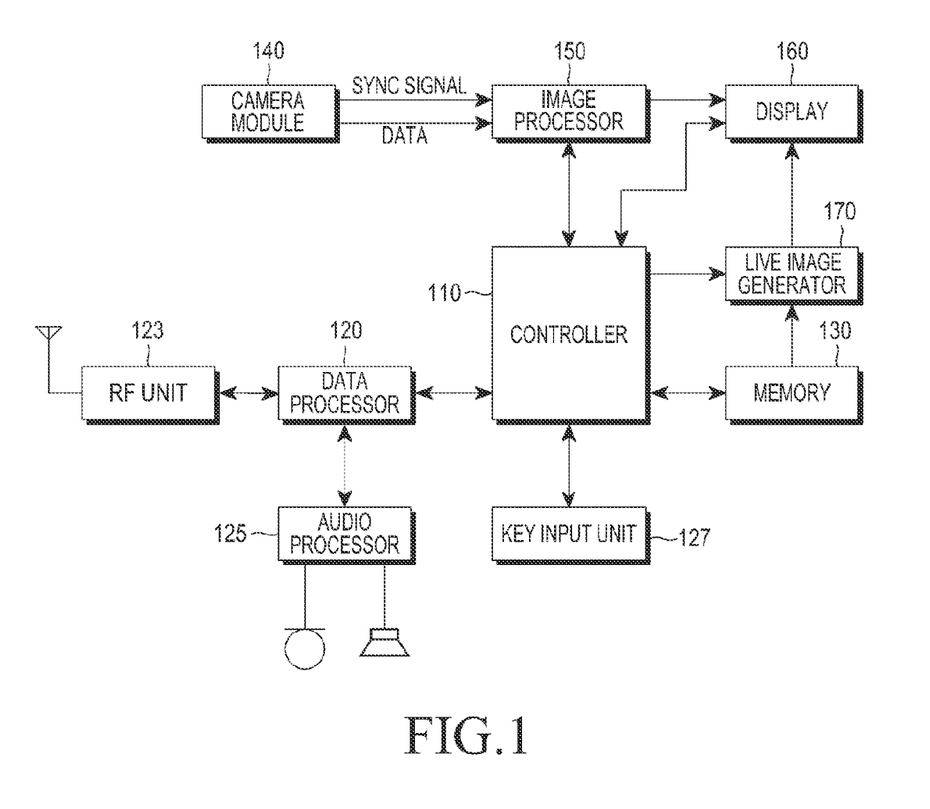
FIG. 1 illustrates the components of a terminal according to an embodiment of the present invention.

FIG. 1 illustrates a terminal according to an embodiment of the present invention.

Referring to FIG. 1, a Radio Frequency (RF) unit 123 is responsible for wireless communication of the terminal. The RF unit 123 includes an RF transmitter for up-converting a frequency of transmission signals and amplifying the up-converted transmission signals, and an RF receiver for low-noise-amplifying received signals and down-converting a frequency of the amplified received signals. A data processor 120 includes a transmitter for coding and modulating the transmission signals, and a receiver for demodulating and decoding the received signals. In other words, the data processor 120 may include a modulator/demodulator (modem—not shown) and a coder/decoder (codec—not shown). The codec includes a data codec for processing packet data and the like, and an audio codec for processing audio signals such as voice. An audio processor 125 plays received audio signals output from the audio codec in the data processor 120 using a speaker, and transfers transmission audio signals picked up by a microphone to the audio codec in the data processor 120.

A key input unit 127 includes numeric/character keys for inputting numeric/character information, and function keys for setting various functions.

A memory 130 may include a program memory (not shown) and a data memory (not shown). The program memory may store programs for controlling the general operations of the terminal, and programs for generating and outputting a new live image in every standby mode of the terminal using single video content. The data memory may temporarily store the data generated during execution of the programs.

In accordance with an embodiment of the present invention, the memory 130 may store a plurality of video content.

A controller 110 controls the overall operation of the terminal.

For example, the controller 110 provides single video content that is set as live wallpaper in the standby mode of the terminal, to a live image generator 170.

By means of the live image generator 170, the controller 110 generates and outputs a new live image in the standby mode using the video content set as the live wallpaper, and upon completion of outputting the generated live image, generates and re-outputs a new live image using the video content.

In accordance with a first embodiment of the present invention, the live image generator 170 selects a number of original frames from original frames constituting single video content that is set as live wallpaper in the standby mode, generates a new live image by interpolating the number of selected original frames, and outputs the generated live image as live wallpaper for the standby mode. For the interpolation, the live image generator 170 applies different weight values to the selected original frames.

The live image generator 170 randomly selects at least twice a number of sequentially arranged frames from the original frames constituting the video content. The live image generator 170 designates the number of frames that are randomly selected at least twice, as at least two sub-sequences, and applies different weight values to the frames of the at least two sub-sequences for the interpolation, to thereby generate a plurality of frames constituting the live image.

If the number of frames of the generated live image is not equal to the preset total number of frames of a live image, the live image generator 170 selects a number of sequentially arranged frames from the original frames constituting the video content starting from the next frame of the last frame included in any one of the at least two sub-sequences, and designates the number of selected frames as a new first sub-sequence. Thereafter, the live image generator 170 randomly selects at least once a number of sequentially arranged frames from the original frames constituting the video content, designates the number of frames which are randomly selected at least once, as a new remaining sub-sequence, and applies different weight values to the frames of the new at least two sub-sequences for the interpolation, to thereby generate a plurality of frames constituting the live image.

If the number of frames of the generated live image is equal to the preset total number of frames of a live image, the live image generator 170 outputs the generated live image as live wallpaper for the standby mode. If the last frame of the generated live image is output while the live image generator 170 outputs the live image as live wallpaper, the live image generator 170 newly randomly selects at least twice a number of sequentially arranged frames from the original frames constituting the video content, and designates the number of frames which are randomly selected at least twice, as at least two sub-sequences. The live image generator 170 applies different weight values to the frames of the at least two sub-sequences for the interpolation, to thereby generate a plurality of frames constituting a new live image.

When generating a live image using two sub-sequences, the live image generator 170 randomly selects twice a number of sequentially arranged frames from the original frames constituting the video content, and designates the number of frames which are randomly selected twice, as first and second sub-sequences. The live image generator 170 applies different weight values to the frames of the first and second sub-sequences using the following Equation (1) for the interpolation, to thereby generate a plurality of frames constituting the live image.

$$p_i = \alpha_{i1} * f_{i1} + \alpha_{i2} * f_{i2} \qquad (1)$$

where $f_{i1}, f_{i2}$ denote a frame of the first sub-sequence and a frame of the second sub-sequence, respectively; $\alpha_{i1}, \alpha_{i2}$ denote a first weight value and a second weight value, respectively (where $\alpha_{i1} + \alpha_{i2} = 1$); and $p_i$ denotes a frame of the generated live image.

If the number of frames of the generated live image is not equal to the preset total number of frames of a live image, the live image generator 170 selects a number of sequentially arranged frames from the original frames constituting the video content starting from the next frame of the last frame included in the second sub-sequence, and designates the number of selected frames as a new first sub-sequence. The live image generator 170 randomly selects a number of sequentially arranged frames from the original frames constituting the video content, and designates the number of randomly selected frames as a new second sub-sequence. Thereafter, the live image generator 170 generates a plurality of frames constituting the live image using Equation (1).

If the number of frames of the generated live image is equal to the preset total number of frames of a live image, the live image generator 170 outputs the generated live image as live wallpaper for the standby mode. When the last frame of the generated live image is output, the live image generator 170 randomly selects twice a number of sequentially arranged frames from the original frames constituting the video content, and newly designates the number of frames which are randomly selected twice, as first and second sub-sequences. Thereafter, the live image generator 170 applies different weight values to the frames of the first and second sub-sequences using Equation (1) for the interpolation, to thereby generate a plurality of frames constituting the live frame.

In accordance with a second embodiment of the present invention, the live image generator 170 selects a number of original frames from the original frames constituting single video content that is set as live wallpaper in the standby mode, calculates a distance value between the number of selected frames, extracts a number of frame pairs in order of the smallest distance value, arranges the number of extracted frame pairs to generate a plurality of frames of the live image, and outputs the generated live image as live wallpaper for the standby mode.

If the last frame of the generated live image is output while the live image generator 170 outputs the live image, the live image generator 170 selects a number of new frames from the original frames constituting the video content, and calculates a distance value between the selected frames. The live image generator 170 extracts a number of frame pairs in order of the smallest value, arranges the number of extracted frame pairs to generate a plurality of frames of the live image, and outputs the generated live image as live wallpaper for the standby mode.

A camera module 140 includes a camera sensor for capturing image data and converting the captured optical image signals into electrical image signals, and a signal processor for converting the analog image signals captured by the camera sensor into digital image data. The camera sensor is assumed to be a Charge-Coupled Device (CCD) or Complementary Metal-Oxide Semiconductor (CMOS) sensor, and the signal processor may be a Digital Signal Processor (DSP). The camera sensor and the signal processor may be integrally or separately implemented.

An image processor 150 performs Image Signal Processing (ISP) to display the image signals output from the camera module 140 on a display 160. The ISP may include, for example, gamma correction, interpolation, spatial variation, image effecting, image scaling, Auto White Balance (AWB), Auto Exposure (AE), and Auto Focus (AF). The image processor 150 processes the image signals output from the camera module 140 on a frame-by-frame basis, and outputs the frame image data depending on the characteristics and size of the display 160. The image processor 150 includes a video codec to compress the frame image data displayed on the display 160 using a coding scheme and to decompress compressed frame image data into its original frame image data using a decoding scheme. The video codec may be a Joint Photographic Experts Group (JPEG) codec, a Moving Picture Experts Group (MPEG4) codec, or a Wavelet codec. If implemented to have On Screen Display (OSD) features, the image processor 150 may output OSD data depending on the size of the displayed screen under control of the controller 110.

The display 160 displays, on a screen, image signals output from the image processor 150 and user data output from the controller 110. The display 160 may be a Liquid Crystal Display (LCD) display. In this case, the display 160 may include an LCD controller, a memory for storing image data, and an LCD panel. When implemented to have an LCD touch screen, the display 160 may also serve as an input unit, and may display the same keys as those on the key input unit 127.

In accordance with an embodiment of the present invention, the display 160 displays a live image generated using the video content that is set as live wallpaper in the standby mode.

Figure 2:
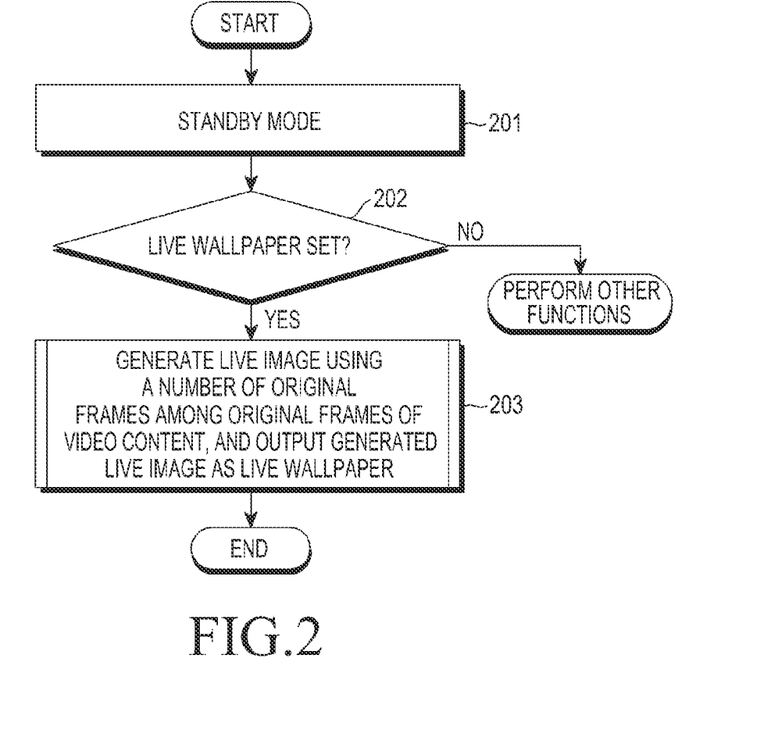
FIG. 2 illustrates a process of generating and outputting a live image in a standby mode in a terminal according to an embodiment of the present invention.
Figure 3A:
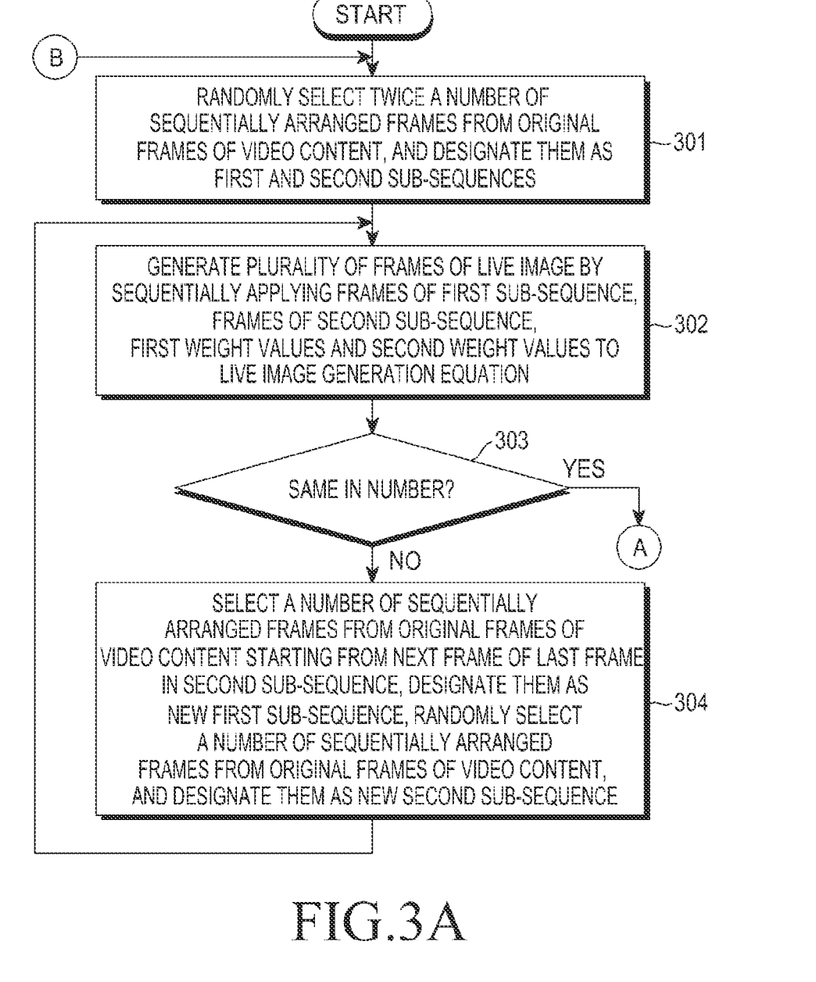
FIGS. 3A and 3B illustrate a process of generating a live image in a standby mode in a terminal according to a first embodiment of the present invention.
Figure 3B:
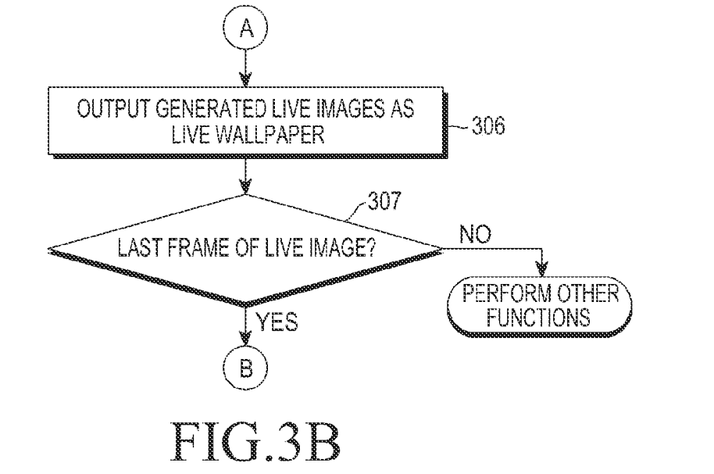
Figure 4:
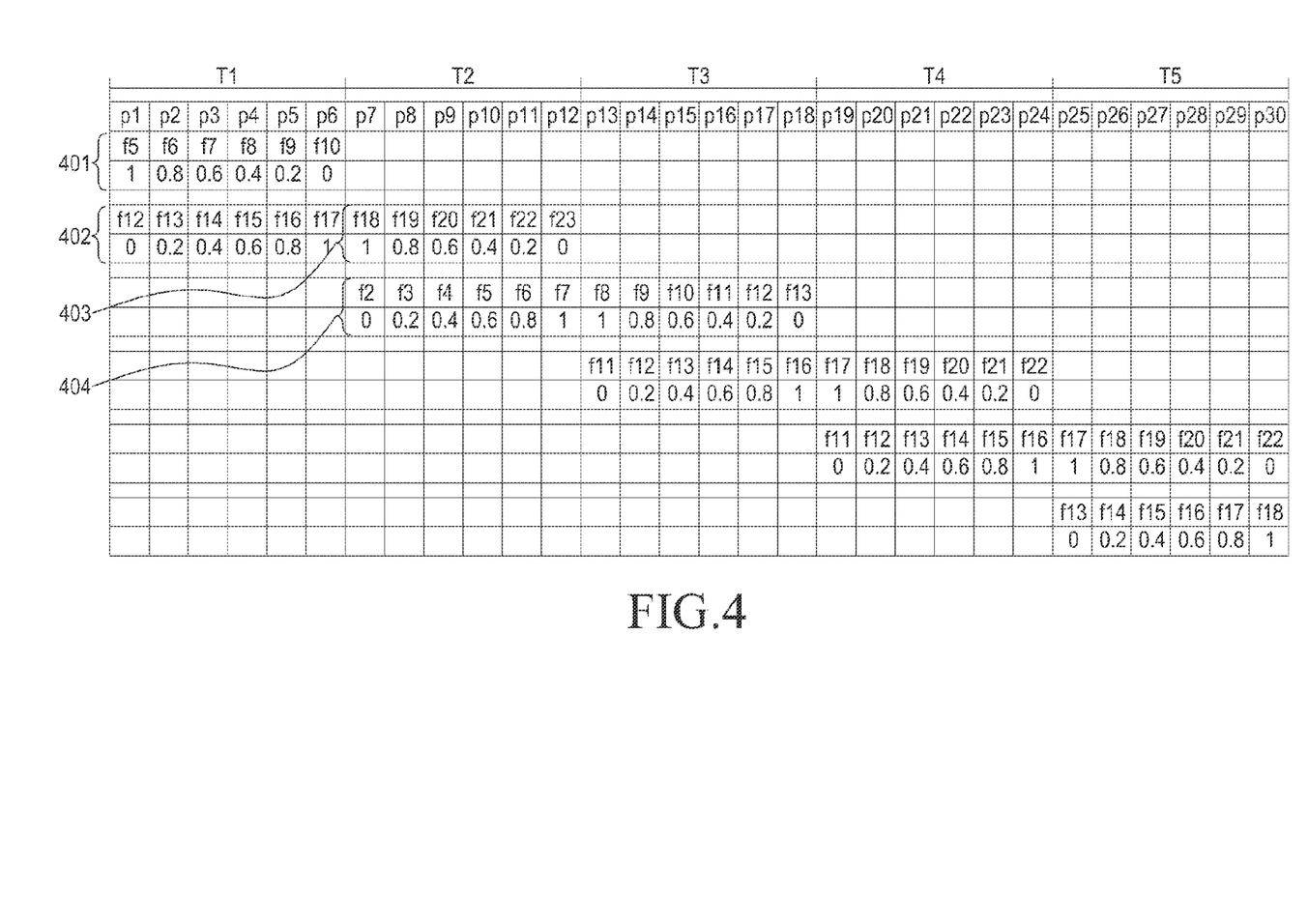
FIG. 4 describes the process of FIGS. 3A and 3B.
Figure 5:
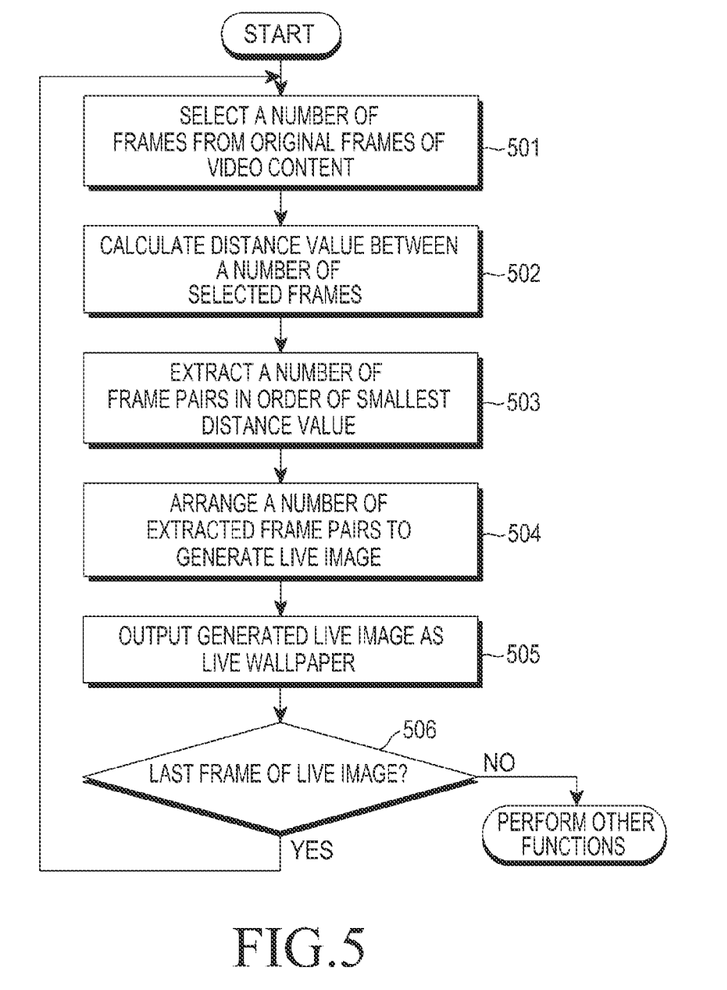
FIG. 5 illustrates a process of generating a live image in a standby mode in a terminal according to a second embodiment of the present invention.

FIG. 2 illustrates a process of generating and outputting a live image in a standby mode in a terminal according to an embodiment of the present invention. FIGS. 3A and 3B illustrate a process of generating a live image in a standby mode in a terminal according to a first embodiment of the present invention. FIG. 4 describes the process of FIGS. 3A and 3B. FIG. 5 illustrates a process of generating a live image in a standby mode in a terminal according to a second embodiment of the present invention. These operations will be described below with reference to FIG. 1.

Referring to FIG. 2, the controller 110 is in a standby mode of the terminal in step 201, and determines in step 202 whether wallpaper for the standby mode is set as live wallpaper. If so, the controller 110 detects video content that is set as live wallpaper, from among video content stored in the memory 130, and transfers the detected video content to the live image generator 170. The video content set as live wallpaper may be any one of a plurality of live images which are separately stored in the memory 130 to be set as live wallpapers in a general terminal, since it includes a plurality of frames for displaying objects having small or internal movements.

In step 203, upon receiving single video content from the controller 110 in the standby mode, the live image generator 170 generates a plurality of frames constituting a new live image in every standby mode using a number of original frames among the original frames constituting the video content.

An operation of generating a new live image using the video content in step 203 will be described with reference to FIGS. 3A to 5.

In the first embodiment of the present invention described with reference to FIGS. 3A and 3B, a new live image is generated using first and second sub-sequences.

Referring to FIGS. 3A and 3B, when original frames constituting the video content are defined as "$f_1, f_2, f_3, \ldots, f_n$" and a plurality of frames constituting a new live image to be generated are defined as "$P_1, P_2, P_3, \ldots, P_n$", the plurality of frames "$P_1, P_2, P_3, \ldots, P_n$" constituting the new live image may be calculated using Equation (1).

Original frames and their associated weight values may be selected in a manner promoting seamless continuity of the plurality of frames "$P_1, P_2, P_3, \ldots, P_n$" constituting a new live image.

In step 301, for selection of the original frames and the weight values, the live image generator 170 randomly selects a number of sequentially arranged original frames from the original frames "$f_1, f_2, f_3, \ldots, f_n$" constituting the video content, and designates the number of selected original frames "$f_{s1}, f_{s1+1}, \ldots, f_{s1+l}$" as a first sub-sequence. Further, the live image selector 170 randomly re-selects a number of sequentially arranged original frames from the original frames "$f_1, f_2, f_3, \ldots, f_n$" constituting the video content, and designates the number of selected original frames "$f_{s2}, f_{s2+1}, \ldots, f_{s2+l}$" as a second sub-sequence.

In step 302, the live image generator 170 generates a plurality of frames "$P_1, P_2, P_3, \ldots, P_n$" constituting a new live image by sequentially applying frames of the first sub-sequence, frames of the second sub-sequence, first weight values differently applied to the frames of the first sub-sequence, and second weight values differently applied to the frames of the second sub-sequence, to Equation (1) which is an Equation for generating a live image.

In step 302, using Equation (1), the live image generator 170 may calculate a plurality of frames "$P_1, P_2, P_3, \ldots, P_n$" constituting a live image to be generated, as follows:

$$\text{A first frame: } p_1 = 1 * f_{s1} + 0 * f_{s2}$$

$$\text{A second frame: } p_2 = \left(1 - \frac{1}{l/2}\right) * f_{s1+1} + \left(\frac{1}{l/2}\right) * f_{s2+1}$$

$$\text{A } k\text{-th frame: } p_k = \left(1 - \frac{k-1}{l/2}\right) * f_{s1+k-1} + \left(\frac{k-1}{l/2}\right) * f_{s2} + k - 1$$

$$\text{A } (l/2+1)\text{-th frame: } p_{l/2+1} = 0 * f_{s1+l/2} + 1 * f_{s2+l/2}$$

A sum of the first and second weight values, which are applied to Equation (1) whenever frames for a new live image are generated, should be '1' ($\alpha_{i1} + \alpha_{i2} = 1$). Therefore, the first weight value has $\alpha_{i1} = \{1, \ldots, 0\}$, while the second weight value has $\alpha_{i2} = \{0, \ldots, 1\}$.

After generating a plurality of frames for a new live image, which are the same in number as the frames of the first and second sub-sequences, by applying frames of the first sub-sequence, frames of the second sub-sequence, the first weight values and the second weight values to Equation (1) in step 302, the live image generator 170 determines in step 303 whether the number of frames of the live image, which are generated in step 302, is equal to the total number of frames of a live image. The 'total number of frames of a live image' as used herein may refer to the total number of frames constituting the live image, and the total number of frames may be preset automatically or manually.

Each of the frames of the first and second sub-sequences, applied in Equation (1), represents pixel values of one frame.

Therefore, if the number of frames of a live image, generated in step 302, is not equal to the total number of frames of a live image in step 303, the live image generator 170 generates additional frames of the live image in step 304.

In step 304, the live image generator 170 extracts the next frame of the last frame among the frames of the second sub-sequence, from the original frames of the video content, and sequentially extracts a number of original frames starting from the extracted next frame.

In other words, the live image generator 170 extracts the next frame "$f_{s2+l/2+1}$" of the last frame "$f_{s2+i}$" among the frames of the second sub-frame, from the original frames of the video content, randomly selects a number of original frames starting from the next frame "$f_{s2+l/2+1}$", and designates these selected original frames as a new first sub-sequence.

In step 304, after designating the new first sub-sequence, the live image generator 170 randomly re-selects a number of sequentially arranged original frames from the original frames of the video content, and designates these selected original frames as a new second sub-sequence.

The live image generator 170 repeats steps 302 to 304 until the number of frames of the live image is equal to the total number of frames of a live image.

If the number of frames of the live image is equal to the total number of frames of a live image in step 303 during the repetition of steps 302 to 304, the live image generator 170 outputs the generated live image as live wallpaper for the standby mode in step 306.

If the last frame of the live image is output in step 307 while outputting the live image as live wallpaper for the standby mode, the live image generator 170 generates a new live image by performing steps 301 to 304.

The operation of FIGS. 3A and 3B will be described below with reference to FIG. 4.

It is assumed in FIG. 4 that the number of original frames "$f_1, f_2, f_3, \ldots, f_{25}$" constituting video content is 25, the total number of frames of a generated live image is preset to 30, and when the first and second sub-sequences are used, frames included in the first and second sub-sequences are equal to 6.

The live image generator 170 randomly selects 6 sequentially arranged original frames "$f_5, f_6, f_7, f_8, f_9, f_{10}$" from the original frames "$f_1, f_2, f_3, \ldots, f_{25}$" of the video content, and designates them as a first sub-sequence 401.

The live image generator 170 randomly selects 6 sequentially arranged other original frames "$f_{12}, f_{13}, f_{14}, f_{15}, f_{16}, f_{17}$" from the original frames "$f_1, f_2, f_3, \ldots, f_{25}$" of the video content, and designates them as a second sub-sequence 402.

First weight values of $\{1, 0.8, 0.6, 0.4, 0.2, 0\}$ are applied to the 6 frames of the first sub-sequence and second weight values of $\{0, 0.2, 0.4, 0.6, 0.8, 1\}$ are applied to the 6 frames of the second sub-sequence.

Therefore, the live image generator 170 generates 6 new frames "$P_1, P_2, P_3, P_4, P_5, P_6$" (T1) constituting a live image by sequentially applying the 6 frames of the first sub-sequence, the 6 first weight values, the 6 frames of the second sub-sequence, and the 6 second weight values to Equation (1).

Since the total number of frames constituting a live image is set to 30, the live image generator 170 sequentially selects 6 frames "$f_{18}, f_{19}, f_{20}, f_{21}, f_{22}, f_{23}$" from the original frames of the video content starting from the next frame "$f_{18}$" of the last frame "$f_{17}$" of the second sub-sequence 402, and designates the 6 selected frames "$f_{18}, f_{19}, f_{20}, f_{21}, f_{22}, f_{23}$" as a new first sub-sequence 403. The live image generator 170 randomly re-selects 6 sequentially arranged frames "$f_2, f_3, f_4, f_5, f_6, f_7$" from the original frames of the video content, and designates the selected 6 frames "$f_2, f_3, f_4, f_5, f_6, f_7$" as a new second sub-sequence 404. The same first and second weight values as those used before are used.

The live image generator 170 generates again 6 new frames "$P_7, P_8, P_9, P_{10}, P_{11}, P_{12}$" (T2) constituting the live image, using Equation (1).

As illustrated in FIG. 4, while performing the above process in T1 to T4, the live image generator 170 may generate 30 frames $P_1$ to $P_{30}$ constituting a live image.

The live image generator 170 may output a live image longer than the video content as the generated live image has 30 frames, which are greater in number than the original frames constituting the video content as illustrated in FIG. 4.

Upon completion of outputting the generated live image, the live image generator 170 generates again a new live image using the video content, so the user may view a live image, which is always differently output in every standby mode.

Although the first and second sub-sequences are assumed to have the same number of frames in FIGS. 3A to 4, they may have a different number of frames.

When the first and second sub-sequences include a disparate number of frames, if only the remaining one frame in the first and second sub-sequences is applied to Equation (1), the applied first and second weight values are (0.5.0.5).

As for the sub-sequences designated to generate a new live image, two sub-sequences may be used as illustrated in FIGS. 3A to 4, three sub-sequences may be used as in the following Equation (2), or four or more sub-sequences may be used.

$$p_i = \alpha_{i1} * f_{i1} + \alpha_{i2} * f_{i2} + \alpha_{i3} * f_{i3} \qquad (2)$$

where $f_{i1}$, $f_{i2}$, $f_{i3}$ denote first, second and third sub-sequences, respectively; $\alpha_{i1}$, $\alpha_{i2}$, $\alpha_{i3}$ denote first, second and third weight values, respectively (where $\alpha_{i1}+\alpha_{i2}+\alpha_{i3}=1$); and $p_i$ denotes a frame of a generated live image.

While performing the same processes as those in FIGS. 3A and 4 using Equation (6), the live image generator 170 may generate a new live image from single video content.

In the second embodiment of the present invention described in connection with FIG. 5, the live image generator 170 randomly selects a number of original frames from the original frames of the video content in step 501.

In step 502, the live image generator 170 calculates a distance value between the number of selected frames, using the following Equation (3).

$$d_{ij} = \text{dist}(f_i, f_j), i < j \qquad (3)$$

In step 503, the live image generator 170 extracts a number of frame pairs in order of the smallest distance value d. In step 504, the live image generator 170 arranges the number of extracted frame pairs, and generates these pairs as a plurality of frames of a live image. The live image generator 170 may extract a number of frame pairs in order of the smallest distance value d, for all the frame pairs, a distance value between frames in each of which are compared with each other.

In step 505, the live image generator 170 outputs the generated live image as live wallpaper for the standby mode. If the last frame of the live image is output in step 506 while outputting the generated live image as live wallpaper for the standby mode, the live image generator 170 randomly re-selects a number of frames from the original frames of the video content in step 501. Thereafter, in steps 502 to 505, the live image generator 170 generates a new live image and outputs the generated live image as live wallpaper for the standby mode.

For example, the live image generator 170 randomly selects 6 sequentially arranged original frames "$f_5, f_6, f_7, f_8, f_9, f_{10}$" from the original frames "$f_1, f_2, f_3, \ldots, f_{25}$" of the video content. The live image generator 170 calculates a distance value between one frame and each of the frames for which the order is higher than the order of the live image generator 170.

The live image generator 170 arranges all the frame pairs having the smallest distance value, and when the plurality of arranged frame pairs are "$(f_5,f_8)$, $(f_6,f_8)$, $(f_5,f_9)$, $(f_5,f_{10})$, $(f_7,f_9)$, $(f_6,f_{10})$, $(f_8,f_9)$, $(f_7,f_8)$, $(f_7,f_{10})$, $(f_9,f_{10})$", the plurality of frames constituting a live image are generated as "$f_5, f_8, f_6, f_8, f_5, f_9, f_5, f_{10}, f_7, f_9, f_6, f_{10}, f_8, f_9, f_7, f_8, f_7, f_{10}, f_9, f_{10}$".

Therefore, if the output of the generated live image is completed in the standby mode, the live image generator 170 randomly re-selects a number of sequentially arranged original frames from the original frames "$f_1, f_2, f_3, \ldots, f_{25}$" of the video content, to thereby generate a new live image.

The disclosed live image generation terminal and method may be implemented in a non-transitory computer-readable recording medium with computer-readable codes. The computer-readable recording medium may include various types of recording devices in which computer-readable data is stored. Examples of the recording medium may include Read-Only Memory (ROM), Random Access Memory (RAM), optical disk, magnetic tape, floppy disk, hard disk, and non-volatile memory. The computer-readable recording medium may be distributed over the computer systems connected by the network, so that computer-readable codes may be stored and executed in a distributed manner.

As is apparent from the foregoing description, the disclosed live image generation terminal and method may generate and output a new live image in every standby mode using single video content that is set as live wallpaper in the standby mode.

While the invention has been illustrated and described with reference to certain embodiments thereof, it will be understood by those skilled in the art that various changes in form and details may be made therein without departing from the spirit and scope of the invention as defined by the appended claims and their equivalents.

What is claimed is:

1. A terminal for generating a live image, comprising:
   a memory for storing video content; and
   a live image generator for selecting a number of original frames from original frames constituting the video content, generating a new live image by interpolating the number of selected original frames, randomly selecting, at least twice, a number of sequentially arranged frames from the original frames constituting the video content, designating the number of frames which are randomly selected at least twice as sub-sequences, applying different weight values to the frames of the sub-sequences for the interpolation, generating a plurality of frames constituting the live image, and outputting the generated live image as live wallpaper.

2. The terminal of claim 1, wherein, if a number of frames of the generated live image is not equal to a preset total number of frames of a live image, the live image generator selects a number of sequentially arranged frames from the original frames constituting the video content starting from a next frame of a last frame included in any one of the sub-sequences, designates the number of selected frames as a new first sub-sequence, randomly selects a number of sequentially arranged frames from the original frames constituting the video content, designates the number of frames which are randomly selected as a new second sub-sequence, applies different weight values to the frames of the new first and second sub-sequences for the interpolation, and generates a plurality of frames constituting the live image.

3. The terminal of claim 1, wherein, if a number of frames of the generated live image is equal to a preset total number of frames of a live image, the live image generator outputs the generated live image as live wallpaper, newly randomly selects at least twice a number of sequentially arranged frames from the original frames constituting the video content when a last frame of the generated live image is output, designates the number of frames which are randomly selected at least twice as sub-sequences, applies different weight values to the frames of the sub-sequences for the interpolation, and generates a plurality of frames constituting a new live image.

4. The terminal of claim 1, wherein the live image generator selects a number of frames from the original frames constituting the video content, calculates a distance value between the number of selected frames, extracts a number of frame pairs in order of a smallest distance value, arranges the number of extracted frame pairs to generate a plurality of frames of the live image, and outputs the generated live image as live wallpaper.

5. The terminal of claim 1, wherein, when a last frame of the generated live image is output, the live image generator selects a number of new frames from the original frames constituting the video content, calculates a distance value between the selected frames, extracts a number of frame pairs in order of a smallest distance value, arranges the number of extracted frame pairs to generate a plurality of frames of the live image, and outputs the generated live image as live wallpaper.

6. A terminal for generating a live image, comprising:
   a memory configured to store video content; and
   a live image generator configured to select a number of original frames from original frames constituting the video content, generate a new live image by interpolating the number of selected original frames, output the generated live image as live wallpaper, randomly select twice a number of sequentially arranged frames from the original frames constituting the video content, designate the number of frames which are randomly selected twice as first and second sub-sequences, apply different weight values to the frames of the first and second sub-sequences, and generate a plurality of frames constituting the live image.

7. The terminal of claim 6, wherein, if the number of frames of the generated live image is not equal to a preset total number of frames of a live image, the live image generator selects a number of sequentially arranged frames from the original frames constituting the video content starting from a next frame of a last frame included in the second sub-sequence, designates the number of selected frames as a new first sub-sequence, randomly selects a number of sequentially frames from the original frames constituting the video content, designates the number of randomly selected frames as a new second sub-sequence, and generates the plurality of frames constituting the live image.

8. The terminal of claim 6, wherein, if the number of frames of the generated live image is equal to a preset total number of frames of a live image, the live image generator outputs the generated live image as live wallpaper, randomly selects twice a number of sequentially arranged frames from the original frames constituting the video content when a last frame of the generated live image is output, designates the number of frames which are randomly selected twice as first and second sub-sequences, applies different weight values to the frames of the first and second sub-sequences, and generates the plurality of frames constituting the live image.

9. The terminal of claim 6, wherein the plurality of frames constituting the live image are generated using:

$$p_i = \alpha_{i1} * f_{i1} + \alpha_{i2} * f_{i2},$$

where $f_{i1}, f_{i2}$ denote a frame of the first sub-sequence and a frame of the second sub-sequence, respectively; $\alpha_{i1}, \alpha_{i2}$ denote a first weight value and a second weight value, respectively (where, $\alpha_{i1} + \alpha_{i2} = 1$); and $p_i$ denotes a frame of the generated live image.

10. A method for generating a live image, comprising:
selecting a number of original frames from original frames constituting video content, and generating a new live image by interpolating the number of selected original frames, randomly selecting twice a number of sequentially arranged frames from the original frames constituting the video content, designating the number of frames which are randomly selected twice as first and second sub-sequences, applying different weight values to the frames of the first and second sub-sequences, and generating a plurality of frames constituting the live image; and
outputting the generated live image as live wallpaper.

11. The method of claim 10, further comprising:
selecting, if the number of frames of the generated live image is not equal to a preset total number of frames of a live image, a number of sequentially arranged frames from the original frames constituting the video content starting from a next frame of a last frame included in the second sub-sequence, and designating the number of selected frames as a new first sub-sequence;
randomly selecting a number of sequentially arranged frames from the original frames constituting the video content, and designating the number of randomly selected frames as a new second sub-sequence; and
generating a plurality of frames constituting the live image.

12. The method of claim 10, further comprising:
outputting, if the number of frames of the generated live image is equal to a preset total number of frames of a live image, the generated live image as live wallpaper;
randomly selecting, if a last frame of the generated live image is output while outputting the live image, twice a number of sequentially arranged frames from the original frames constituting the video content, and newly designating the number of frames which are randomly selected twice, as first and second sub-sequences;
applying different weight values to the frames of the first and second sub-sequences; and
generating a plurality of frames constituting the live image.

13. The method of claim 10, wherein generating the new live image comprises:
selecting a number of frames from the original frames constituting the video content;
calculating a distance value between the number of selected frames;
extracting a number of frame pairs from among the number of selected frames in order of a smallest distance value;
arranging the number of extracted frame pairs; and
generating a plurality of frames of the live image.

14. The method of claim 10, further comprising:
selecting, if a last frame of the generated live image is output, a number of new frames from the original frames constituting the video content;
calculating a distance value between the selected new frames, and extracting a number of frame pairs in order of the smallest distance value;
arranging the number of selected frame pairs; and
generating a plurality of frames of the live image.

15. The method of claim 10, wherein the plurality of frames constituting the live image are generated using:

$$p_i = \alpha_{i1} * f_{i1} + \alpha_{i2} * f_{i2},$$

where $f_{i1}, f_{i2}$ denote a frame of the first sub-sequence and a frame of the second sub-sequence, respectively; $\alpha_{i1}, \alpha_{i2}$ denote a first weight value and a second weight value, respectively (where, $\alpha_{i1} + \alpha_{i2} = 1$); and $p_i$ denotes a frame of the generated live image.

16. A method for generating a live image, comprising:
selecting a number of original frames from original frames constituting video content, and generating a new live image by interpolating the number of selected original frames, randomly selecting, at least twice, a number of sequentially arranged frames from the original frames constituting the video content, designating the number of frames which are randomly selected at least twice, as at least two sub-sequences, applying different weight values to the frames of the at least two sub-sequences for the interpolation, and generating a plurality of frames constituting the live image; and
outputting the generated live image as live wallpaper.

17. The method of claim 16, further comprising:
selecting, if the number of frames of the generated live image is not equal to a preset total number of frames of a live image, a number of sequentially arranged frames from the original frames constituting the video content starting from a next frame of a last frame included in a last sub-sequence among the at least two sub-sequences, and designating the number of selected frames as a new first sub-sequence; and
randomly selecting at least once a number of sequentially arranged frames from the original frames constituting the video content, and designating the number of frames which are randomly selected at least once, as a new second sub-sequence.

18. The method of claim 16, further comprising:
outputting, if the number of frames of the generated live image is equal to a preset total number of frames of a live image, the generated live image as live wallpaper;
newly randomly selecting, if a last frame of the generated live image is output while outputting the live image, at least twice a number of sequentially arranged frames from the original frames constituting the video content; and
designating the number of frames which are randomly selected at least twice, as at least two sub-sequences.

19. A non-transitory computer-readable recording medium having recorded thereon a computer program for executing a method of generating a live image, the method comprising:
selecting a number of original frames from original frames constituting video content, randomly selecting, at least twice, a number of sequentially arranged frames from the original frames constituting the video content, designating the number of frames which are randomly selected at least twice, as at least two sub-sequences, applying different weight values to the frames of the at least two sub-sequences for the interpolation, and generating a plurality of frames constituting the live image, and generating a new live image by interpolating the number of selected original frames; and
outputting the generated live image as live wallpaper.

* * * * *